Oct. 26, 1948.    P. H. KEMMER ET AL    2,452,058
TENSION PATCH
Filed Jan. 17, 1946    2 Sheets-Sheet 1
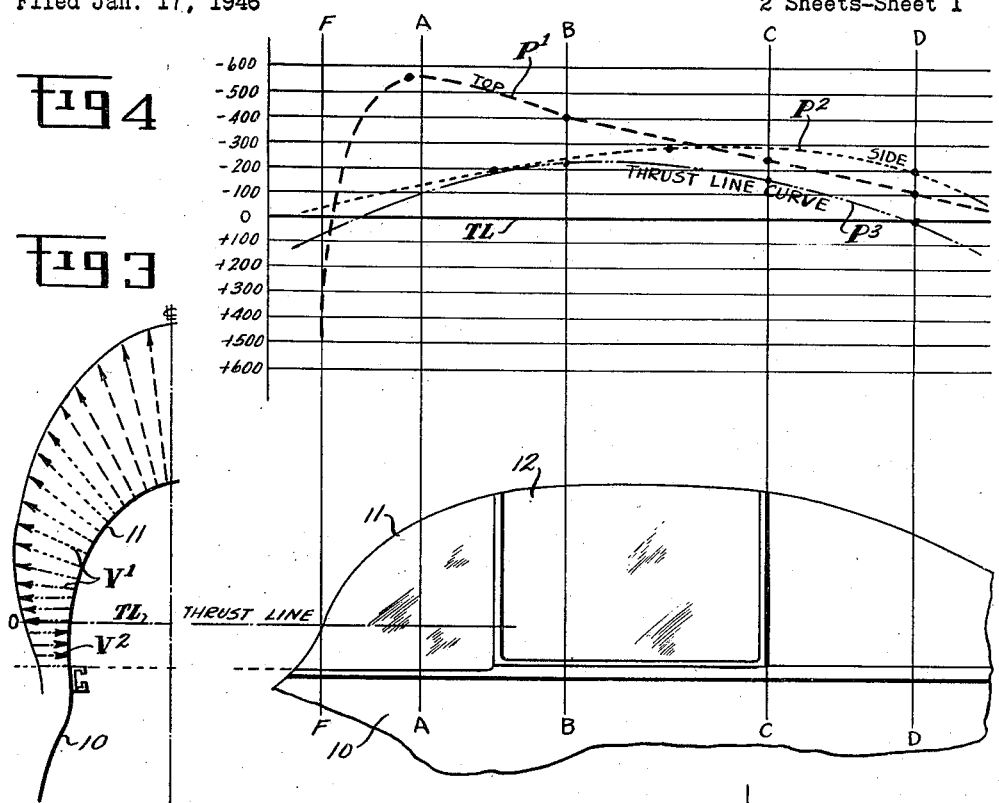
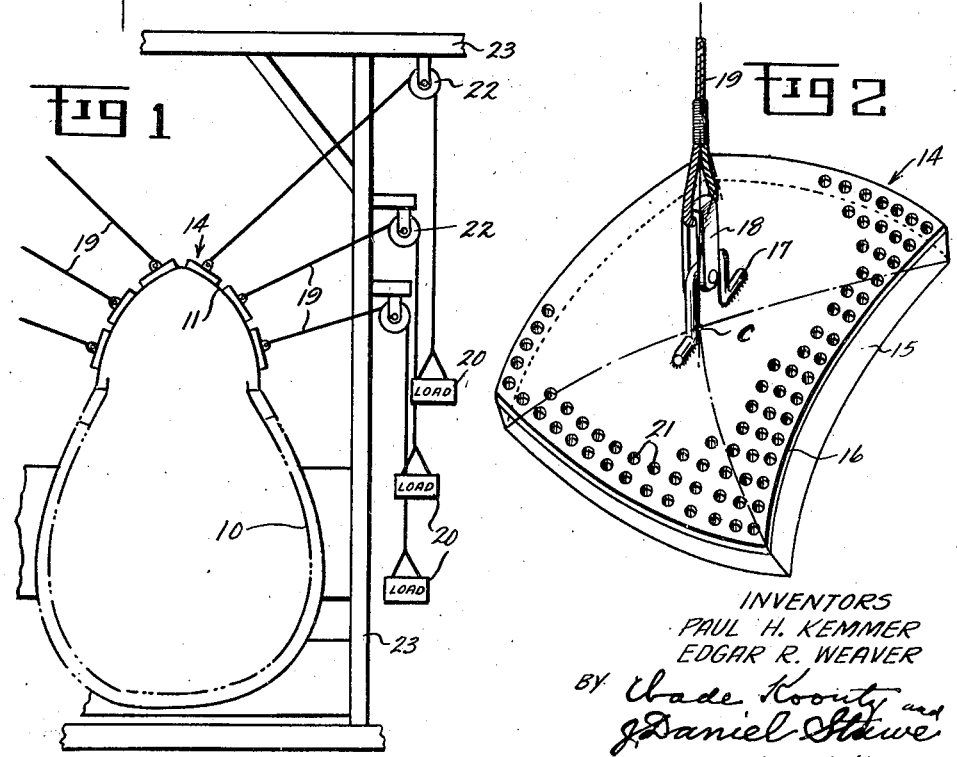
INVENTORS
PAUL H. KEMMER
EDGAR R. WEAVER
BY
ATTORNEYS Oct. 26, 1948.     P. H. KEMMER ET AL     2,452,058
TENSION PATCH
Filed Jan. 17, 1946     2 Sheets-Sheet 2
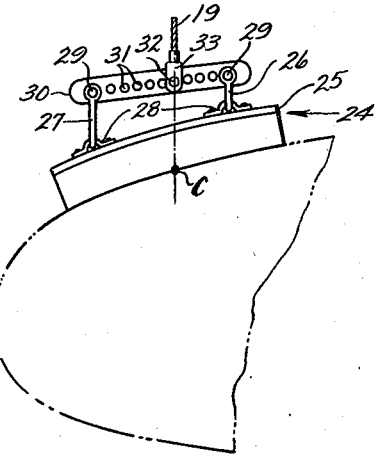
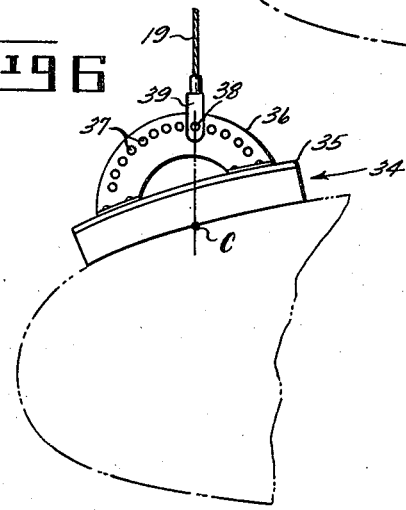
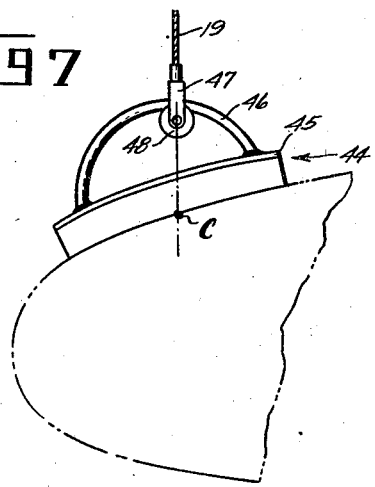
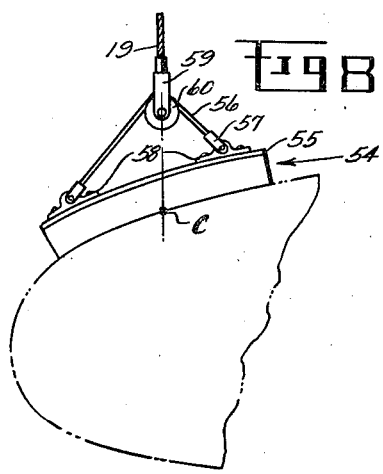
INVENTORS
PAUL H. KEMMER
EDGAR R. WEAVER
BY
ATTORNEYS

UNITED STATES PATENT OFFICE 2,452,058

TENSION PATCH

Paul H. Kemmer, Fairfield, and Edgar R. Weaver, Dayton, Ohio

Application January 17, 1946, Serial No. 641,857

5 Claims. (Cl. 73—88)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a tension patch for static testing of airfoils, canopies, bubbles, blisters and "radomes" (i. e., radar domes) of aircraft, especially military aircraft. Various methods of testing the strength of aircraft wings and similar structures have been proposed. For instance, the C. F. Beed Patent No. 2,340,505 dated February 1, 1944, discloses "aerofoil testing apparatus" comprising a series of sponge rubber layers secured by an adhesive to the upper and lower surfaces of an airplane wing, with a series of wood blocks secured to the sponge rubber and held in a frame which surrounds the wing and is acted upon by adjustable forces whereby tension may be applied to the sponge rubber layers on the upper face of the wing and compression may be simultaneously applied to the sponge rubber layers attached to the underside of the wing. However, the frames are spaced apart spanwise of the wings, so that the forces imposed on a wing are not continuous as in actual flight, and furthermore the frames are so made that canopies, bubbles, blisters and "radomes" cannot be tested.

This invention aims to provide improved apparatus for testing surfaces of an aircraft for bursting strength so that portions of the aircraft may be subjected to substantially the same loads to which they would be subjected while in actual flight. A particular object is to provide a tension patch which is equally stressed throughout its area even though applied to curved surfaces, the result being that there are no overloaded portions which are likely to fail, compelling repetition of the test with serious impairment of laboratory procedure. Another object is to provide a tension patch which is so made as to obviate the entrapment of any air between the cemented surfaces of the tension patch and the object under test. Further objects will be understood by referring to the following description of embodiments of the invention in connection with the accompanying drawings forming part of this specification.

In the drawings:

Fig. 1 is a diagrammatic sectional elevation showing part of a fuselage with a sliding canopy under a static test, only part of the testing apparatus being shown for simplicity of illustration;

Fig. 2 is a perspective view of one form of a compound curved tension patch such as may be used in a test like that of Fig. 1, perforations being indicated in the patch to obviate the entrapment of air under its nether surface;

Fig. 3 is a pressure diagram of part of the fuselage of Fig. 1, showing different pressures on the sliding canopy at moderate air speeds by means of vectors, which are not necessarily to scale;

Fig. 4 is a pressure diagram of the same fuselage and canopy shown in side elevation, various pressure curves being shown for different sections; and Figs. 5 to 8 inclusive are views in side elevation showing four different forms of tension patches applied to a surface under test.

Referring to the drawings, and first to Figs. 3 and 4, part of a fuselage 10 is shown having a canopy 11 with a sliding section 12. Above the thrust line T—L the canopy when traveling through the air at moderate speed, say 200–250 M. P. H., is subjected to bursting pressure due to the negative pressure of lift, as shown by the outwardly directed vectors $V^1$. Below the thrust line T—L, the canopy is subjected to compression, as indicated by the inwardly directed vectors $V^2$. As viewed from the side, the top part of the canopy sustains the greatest bursting pressure approximately in the plane of line A—A, and this pressure rapidly drops to zero forwardly of plane A—A and becomes a compression whose value is nearly as great in the plane of line F—F at the front part of the canopy as is the absolute value of the bursting pressure in the plane A—A. Other values in planes B—B, C—C and D—D are also shown for the canopy top, and a curve $P^1$ for the top is shown including all these values. Similar curves $P^2$ and $P^3$ are also shown for pressure values respectively along the side (45° angle) and along the thrust line, at the same air speed. The very great variation in pressure to which different portions of the canopy are subjected at a single air speed is thus made abundantly clear. Different curves will result at increased or decreased air speeds and of course almost any change in shape of the canopy will make marked differences in the shapes of the pressure curves at all speeds. A similar family of curves could be shown for a large number of blisters, "radomes," bubbles and airfoils which have been tested in wind tunnels at various air speeds. The foregoing will make it clear that the static testing of many parts of an airplane is a highly complex business since there are large pressure differentials at points only a few inches apart.

In accordance with the invention, we provide tension patches consisting of a layer or body of synthetic rubber or similar material, being relatively soft, backed by a base plate which is of relatively hard material, being preferably of metal, the base plate being secured by an adhesive to the rubber body and having coupling means by which a load may be applied to the tension patch, whose underside is cemented to the surface under test. Instead of synthetic rubber for the body of the patch we may employ wool or other hairy hide or cotton fabric as disclosed in our Patent No. 2,358,369, dated September 19, 1944. Reference should also be made to our Patent No. 2,383,491, dated August 28, 1945.

In the form of the invention shown in Fig. 2, a tension patch 14 of compound curvature is shown, consisting of a rubber body 15 whose underside is curved on two axes to fit perfectly the compound curvature of a "radome," canopy, blister, etc., to which it may be secured by the proper type of cement such as "EC613" sold by Minnesota Mining & Manufacturing Company, St. Paul, Minnesota. The rubber body 15 is cemented to a metal base plate 16 to the center of which a stirrup 17 is welded. A clevis 18 is linked with stirrup 17 and a wire rope or cable 19 is secured to clevis 18 and transmits the load 20, as shown in Fig. 1, which may be one or more sandbags, or in some cases hydraulic cylinders or the like may be employed. It will be observed that the centroid C of the cemented area is directly beneath the line of tension of rope 19, so that the entire area of the rubber body 15 is evenly loaded. If the line of tension, prolonged, does not contain centroid C, then there will be underloaded areas and overloaded areas, and the overload may be sufficient to cause the adhesive layer or the rubber body to give way, with the result that the entire test must be repeated. Another feature is the provision of a considerable number of perforations 21 which are provided both in the metal base plate 16 and in the rubber or other body 15, to make it impossible to entrap air between the surface to be tested and the nether or cemented side of the tension patch.

Referring again to Fig. 1, it may be assumed that canopy 11 is being tested with the aid of a considerable number of tension patches 14 like the one shown in Fig. 2. Each patch 14 has a wire rope 19 attached thereto, and all such ropes pass over properly positioned pulleys 22 (only three being shown) and support loads 20 of various weights calculated to impose the proper tension on the corresponding tension patches. Pulleys 22 are carried on an open steel frame 23 made of I-beams and other standard shapes, which normally encloses the object under test, while permitting personnel of the laboratory to have free access to the object to place and remove the tension patches. Frame 23 may be portable so that it may be moved about on the floor of the laboratory, or it may be fixed to a wall of the building.

While tension patches 14 are perfectly satisfactory if the lines of tension of the ropes 19 extend in the proper direction; however, should the ropes not be supported properly to bring the centroid of the tension patch in the line of tension, then each tension patch will have an area of low tension and other areas which are overloaded, as previously stated.

In Figs. 5-8, we show four different forms of tension patches each of which has means interposed between its rope and the base plate and acting automatically to make the line of tension always include the centroid. Each of these four modifications may have perforations like perforations 21, Fig. 2, although the same are not shown.

In the form of Fig. 5, the tension patch 24 includes a base plate 25 and a pair of clevises 26, 27 of unequal length, each clevis 26, 27 being hinged at one end to the base plate by means of straps 28 secured to said plate and providing eyes, each clevis being pivotally connected at the other end by pins 29 to a straight bar 30. This bar 30 has a longitudinally extending row of perforations 31 for a clevis pin 32 by which clevis 33 may be secured to the bar at a selected point. Rope 19 is secured to the clevis 33 and is trained over a pulley as previously explained. If clevis pin 32 is properly positioned on bar 30, the line of tension of rope 19 will pass through the centroid C.

In the form of Fig. 6, the tension patch 34 includes a base plate 35 which has an arcuate plate or bar 36 secured thereto, said arcuate plate having a plurality of arcuately arranged perforations 37 for receiving a clevis pin 38 of a clevis 39 whereby the rope 19 is anchored to the tension patch. By properly selecting the position of clevis pin 38, the line of tension may be made to pass through the centroid C.

In the form of Fig. 7, the tension patch 44 includes a base plate 45 which has an arcuate rod or stirrup 46 welded thereto, and a clevis 47, which is anchored to the end of rope 19, carries a grooved sheave 48 which may travel along the arcuate rod to automatically line up the cable with the centroid C.

In the form of Fig. 8, the tension patch 54 includes a base plate 55 which has a short wire cable 56 secured at both ends by cable anchors 57 in the eyes in blocks 58 secured to the base plate. Cable 56 is longer than the distance between blocks 58, and its anchors 57 may be pivoted in the blocks. A clevis 59, which is secured to the end of rope 19, carries a grooved sheave 60 which travels over wire cable 56 to cause rope 19 to line up automatically with the centroid C.

The four forms of tension patch shown in Figs. 5-8 inclusive are characterized by the application of the line of force through the centroid of the cemented area, either by adjustment of the rope coupling device or by automatic adjustment caused by the construction of the coupling device. The result is an evenly distributed tension over the entire cemented area and there are consequently no overloaded areas. The bars 30, 36 and 46 of Figs. 5, 6 and 7 and the cable 56 of Fig. 8 may be termed load distributing members, since they are attached at opposite end portions to the base plates of the tension patches illustrated and thus act to distribute the load more evenly across the tension patch structure.

Having described our invention, what we claim as new and desire to secure by Letters Patent is:

1. A tension patch for load testing of aircraft comprising, a relatively soft sheet member adapted to be cemented throughout one side to a portion of the outer surface of an aircraft structure under test, a relatively hard base plate having the same size and outline as said sheet member and firmly secured thereto in contiguous face-to-face relation, load attaching means including a load distributing member extending across said base plate and having opposite end portions secured thereto, a tension cable attaching means connected to said load distributing member at a point between its opposite end portions, means along the length of said load distributing member, between said end portions, providing for adjustment of said cable attaching means with respect to said opposite end portions of said load distributing member in order to connect said tension cable attaching means at a selected point along said load distributing member such that the line of the tension force exerted by the tension cable will intersect the centroid of the cemented area of said sheet member.

2. A tension patch for load testing of aircraft comprising, a relatively soft sheet member adapted to be cemented throughout one side to a portion of the outer surface of an aircraft structure under test, a relatively hard base plate having the same size and outline as said sheet member and firmly secured thereto in contiguous face-to-face relation, load attaching means including a rigid bar extending across said base plate and having opposite end portions secured thereto, a tension cable attaching means connected to said bar at a point between its opposite end portions, means along the length of said bar, between said end portions, providing for adjustment of said cable attaching means with respect to said opposite end portions of said bar in order to connect said tension cable attaching means at a selected point along said bar such that the line of the tension force exerted by the tension cable will intersect the centroid of the cemented area of said sheet member.

3. A tension patch for load testing of aircraft comprising, a relatively soft sheet member adapted to be cemented throughout one side to a portion of the outer surface of an aircraft structure under test, a relatively hard base plate having the same size and outline as said sheet member and firmly secured thereto in contiguous face-to-face relation, said sheet member and base plate being pierced by a multiplicity of perforations which extend from the cemented surface of said sheet member to the outer face of the base plate to provide for the escape of air which may be entrapped between the sheet member and the outer surface of the structure under test, load attaching means including a rigid bar extending across said base plate and having opposite end portions secured thereto, a tension cable attaching means connected to said bar at a point between its opposite end portions, means along the length of said bar, between said end portions, providing for adjustment of said cable attaching means with respect to said opposite end portions of said bar in order to connect said tension cable attaching means at a selected point along said bar such that the line of the tension force exerted by the tension cable will intersect the centroid of the cemented area of said sheet member.

4. A tension patch for load testing of aircraft comprising, a relatively soft sheet member adapted to be cemented throughout one side to a portion of the outer surface of an aircraft structure under test, a relatively hard base plate having the same size and outline as said sheet member and firmly secured thereto in contiguous face-to-face relation, load attaching means including a rigid bar extending across said base plate and having opposite end portions secured thereto, a tension cable attaching means including an element passing through any one of a series of perforations in said bar extending longitudinally thereof in order to connect said tension cable attaching means to said bar at a selected point therealong such that the line of the tension force exerted by the tension cable will intersect the centroid of the cemented area of said sheet member.

5. A tension patch for load testing of aircraft comprising, a relatively soft sheet member adapted to be cemented throughout one side to a portion of the outer surface of an aircraft structure under test, a relatively hard base plate having the same size and outline as said sheet member and firmly secured thereto in contiguous face-to-face relation, load attaching means including an outwardly curved rigid bar extending across said base plate and having opposite end portions secured thereto, a tension cable attaching means including a sheave adapted to roll on said curved bar and a cable attaching clevis having said sheave rotatably mounted thereon, the application of tension to the cable attached to said clevis being adapted to automatically adjust the position of said sheave along said curved bar to a point such that the line of the tension force exerted by the tension cable will intersect the centroid of the cemented area of said sheet member.

PAUL H. KEMMER.
EDGAR R. WEAVER.

REFERENCES CITED

The following references are of record in the file of this patent:

UNITED STATES PATENTS

| Number | Name | Date |
| --- | --- | --- |
| 1,159,667 | Haley | Nov. 9, 1915 |
| 1,852,758 | Schroeder | Apr. 5, 1932 |
| 2,048,144 | Showers, Jr. | July 21, 1936 |
| 2,319,675 | Grinter | May 18, 1943 |
| 2,358,369 | Weaver et al. | Sept. 19, 1944 |
| 2,404,602 | Stofflet | July 23, 1946 |

FOREIGN PATENTS

| Number | Country | Date |
| --- | --- | --- |
| 39,422 | Norway | Aug. 4, 1924 |
| 440,656 | Great Britain | Jan. 3, 1936 |